United States Patent
Cartes et al.

(10) Patent No.: US 7,467,306 B2
(45) Date of Patent: Dec. 16, 2008

(54) METHODS AND SYSTEMS FOR ALLOCATING POWER TO AN ELECTRONIC DEVICE

(75) Inventors: Andrew C. Cartes, Cypress, TX (US); Andrew Brown, Houston, TX (US); Gordon M. Barton, Houston, TX (US); Peter Hansen, Cypress, TX (US)

(73) Assignee: Hewlett-Packard Development Company, L.P., Hosuton, TX (US)

( * ) Notice: Subject to any disclaimer, the term of this patent is extended or adjusted under 35 U.S.C. 154(b) by 368 days.

(21) Appl. No.: 11/074,424

(22) Filed: Mar. 8, 2005

(65) Prior Publication Data

US 2006/0206730 A1    Sep. 14, 2006

(51) Int. Cl.
*G06F 1/00* (2006.01)
*G06F 1/32* (2006.01)

(52) U.S. Cl. .................. 713/300; 713/320; 713/323

(58) Field of Classification Search .............. 713/300, 713/320, 323, 340, 330; 710/16
See application file for complete search history.

(56) References Cited

U.S. PATENT DOCUMENTS

| | | | | |
|---|---|---|---|---|
| 5,530,879 A | * | 6/1996 | Crump et al. ............. 713/323 |
| 5,532,945 A | * | 7/1996 | Robinson .................. 713/321 |
| 5,842,027 A | * | 11/1998 | Oprescu et al. ........... 713/300 |
| 6,049,879 A | * | 4/2000 | Davis et al. ............... 713/300 |
| 6,594,771 B1 | * | 7/2003 | Koerber et al. ........... 713/330 |
| 6,785,827 B2 | * | 8/2004 | Layton et al. ............. 713/300 |
| 6,804,616 B2 | * | 10/2004 | Bodas ...................... 702/61 |
| 6,904,534 B2 | * | 6/2005 | Koenen ..................... 713/323 |
| 7,024,567 B2 | * | 4/2006 | Kim et al. ................. 713/300 |
| 7,131,019 B2 | * | 10/2006 | Lee ......................... 713/340 |
| 7,240,225 B2 | * | 7/2007 | Brewer et al. ............. 713/300 |
| 2002/0066045 A1 | * | 5/2002 | Layton et al. ............. 713/300 |
| 2003/0065958 A1 | | 4/2003 | Hansen et al. |
| 2003/0112582 A1 | | 6/2003 | Sanders et al. |
| 2004/0133370 A1 | | 7/2004 | Lavoie et al. |
| 2004/0167732 A1 | | 8/2004 | Spitaels et al. |
| 2005/0060440 A1 | * | 3/2005 | Meynard et al. ........... 710/16 |

* cited by examiner

*Primary Examiner*—Suresh K Suryawanshi (57) ABSTRACT

In at least some embodiments, a system comprises an electronic device having an adjustable hardware inventory and control logic coupled to the electronic device. The control logic initially allocates a first amount of power to the electronic device based on predetermined maximum power needs of the electronic device and later allocates a second amount of power to the electronic device based on a determination of a true hardware inventory of the electronic device.

20 Claims, 4 Drawing Sheets

METHODS AND SYSTEMS FOR ALLOCATING POWER TO AN ELECTRONIC DEVICE

BACKGROUND

In a shared resource environment such as a rack of electronic devices (e.g., servers), communal resources (e.g., power) are allocated to each electronic device prior to power up. Electronic devices with variable hardware inventories may be configured to allocate worst-case theoretical power needs. While allocating for worst-case theoretical power needs prevents power overloads, such allocation is potentially wasteful. Therefore, methods and systems that efficiently allocate power are desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a collection of two or more parts and may be used to refer to a computer system environment, a portion of a computer system, or a network of computer systems.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described herein, embodiments of the invention provide methods and systems that allocate power to one or more electronics devices (e.g., servers) having variable hardware inventories based on actual power consumption. In at least some embodiments, a system may initially provide worst-case theoretical power needs to an electronic device. After the electronic device receives power, a determination of actual hardware inventory occurs. The amount of power allocated to the electronic device may be adjusted (i.e., reduced) from worst-case theoretical power needs to actual power needs based, at least in part, on the determination of actual hardware inventory. As used herein, power "allocation" or "allocating" power refers to allocating, assigning, configuring or otherwise controlling a portion of power from a source or "pool" of power for use with at least one device.

Figure 1:
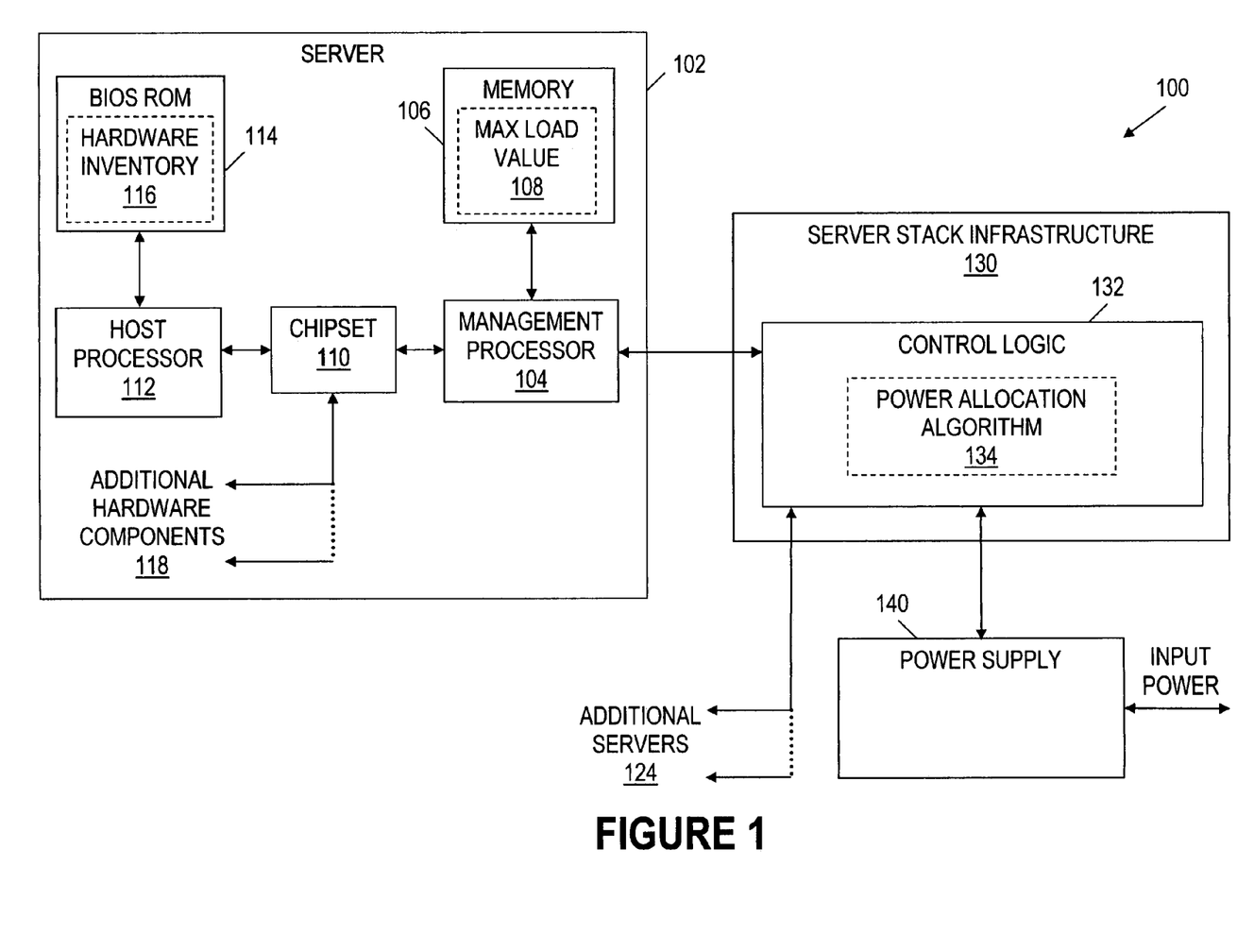
FIG. 1 shows a system in accordance with embodiments of the invention.

FIG. 1 illustrates a system 100 in accordance with embodiments of the invention. As shown in FIG. 1, the system 100 comprises a server stack infrastructure 130 coupled to a server 102 as well as additional servers 124. The server stack infrastructure 130 couples to a power supply 140 and allocates power from the power supply 140 to the servers 102, 124. The additional servers 124 are not shown in detail, but may comprise similar components as is shown for the server 102. Each of the servers 102, 124 has a "hardware inventory" that represents some or all of the hardware components of that server. The servers 102, 124 may have the same hardware inventories or different hardware inventories. Additionally, each server 102, 124 may have an amount of hardware inventory equal to or less than a predetermined maximum hardware inventory of each server 102, 124.

As shown in FIG. 1, the server 102 comprises a host processor 112 coupled to a chipset 110 (e.g., a north bridge and/or south bridge). The host processor 112 also couples to a memory 114 that stores a hardware inventory 116 of the server 102. For example, the memory 114 may be a Read-Only Memory (ROM) associated with the server's Basic Input/Output System (BIOS). The server 102 further comprises a management processor 104 and additional hardware components 118 coupled to the chipset 110. The additional hardware components 118 may comprise processing devices, storage devices or other power consuming devices. The management processor 104 enables remote booting of the server 102, a remote graphical console or other functions. As shown, the management processor 104 is coupled to a memory 106 that stores a maximum load value 108. In some embodiments, one of the functions of the management processor 104 is to read the maximum load value 108 stored in the memory 106 and provide the maximum load value 108 to the server stack infrastructure 130 when the server 102 is "off."

The power supply 140 is capable of providing a limited amount of electrical power (e.g., 5000 Watts) to the servers 102, 124. Thus, allocation of the limited electrical power provided by the power supply 140 is necessary. If the servers 102, 124 require more electrical power than can be provided by the power supply 140, one or more additional power supplies may be used. However, additional power supplies are costly and require space that may not be available in a server rack. Also, additional cooling mechanisms may be necessary if additional power supplies are used.

To allocate electrical power to the servers 102, 124, the server stack infrastructure 130 implements control logic 132 that communicates with the servers 102, 124. The control logic 142 comprises a power allocation algorithm 134. In some embodiments, the power allocation algorithm 134 allocates power to the servers 102, 124 on a first-come, first-served basis. In alternative embodiments, the power allocation algorithm 134 allocates power to the servers 102, 124 based on a prioritization of the servers 102, 124. For example, a "power shedding" technique may be used to prioritize power allocation.

In some embodiments, the power allocation process involves the server stack infrastructure 130 receiving information from the management processors of the servers 102, 124 before the servers are powered on. While the same (or similar) power allocation process applies to the additional servers 124, a representative description of the power allocation process using the server 102 is described herein. To allocate power to the server 102, the control logic 132 communicates with the server's management processor 104. The management processor 104 is powered on even when the server 102 is off. As such, the management processor 104 may be configured to read the predetermined maximum load value 108 stored in the memory 106 and to provide the maximum load value 108 to the control logic 132 of the server stack infrastructure.

For example, in some embodiments, the management processor 104 provides the maximum load value 108 to the control logic 132 in response to a query from the control logic 132. The maximum load value 108 represents worst-case theoretical power needs of the server 102. The worst-case theoretical power needs may be based on a predetermined maximum hardware inventory supported by the server 102 as well as a maximum power usage of each of the hardware components.

After receiving the maximum load value 108 for each server 102, 124, the control logic 132 configures the power distribution algorithm 134 to allocate power to the servers 102, 124 according to each maximum load value (e.g., maximum load value 108) and according to a "power on" signal that indicates when a server 102, 124 requests power. For example, the "power on" signal may be associated with a manually-controlled power switch on each server 102, 124 or with a remote booting technique (e.g., the management processor 104 may permit remote booting). In some embodiments, the power distribution algorithm 134 dynamically allocates and re-allocates power, for example, when individual servers 102, 124 are powered on and off.

When a server 102, 124 receives power from the power supply 140, a determination of actual hardware inventory occurs so that unneeded power allocated to a given server 102, 124 may be allocated to other servers. While the same (or similar) hardware determination process applies to the additional servers 124, a representative description of re-allocating power from the server 102 is described herein.

To determine the actual hardware inventory of the server 102, a host processor 112 of the server 102 accesses the memory 114 which stores a hardware inventory 116 (e.g., a hardware inventory table). As previously mentioned, the memory 114 may be a Read-Only Memory (ROM) and may contain Basic Input/Output System (BIOS) instructions of the server 102. When the server 102 powers up, BIOS instructions stored in the memory 114 cause the host processor 112 to query and identify all of the hardware components of the server 102. The host processor 112 also may query and identify a maximum power consumption of the hardware components. A representative hardware inventory 116 of the server 102 is shown in Table 1 below.

TABLE 1

| COMPONENT NAME | COMPONENT ID# | MAX POWER (WATTS) |
|---|---|---|
| HOST PROCESSOR | 0001 | 100 |
| CHIPSET | 0010 | 75 |
| BIOS ROM | 0011 | 25 |
| OTHER HARDWARE (1) | 0100 | 75 |
| OTHER HARDWARE (2) | 0101 | 50 |

As shown in Table 1, the hardware inventory 116 may store for each hardware component: a component name, a component identification (ID) number and a maximum power rating. The component name identifies the component using a name provided by a manufacturer of the server 102 or by a manufacturer of the hardware component. The component ID number identifies a unique number associated with each hardware component. The component ID number may be provided by the manufacturer of the server 102 or by the manufacturer of the hardware component. The maximum power rating identifies the maximum power consumption of each hardware component. The maximum power rating corresponds to worst-case theoretical power needs of each hardware component. For example, a maximum power rating of a disk drive is approximately equal to the power consumed when the disk drive is spinning at a maximum speed. Also, the maximum power rating of the host processor 112 should be approximately equal to the power consumed by the host processor 112 when the server 102 is executing an application that is maximally intensive for the host processor 112.

By summing the maximum power ratings of the identified hardware components, the host processor 112 estimates the actual power needs of the server 102. In some embodiments, the estimate of the actual power needs (hereafter referred to as the "net power requirement") also takes into account hot-pluggable components such as fans and disk drives that may not be currently present but may be plugged into the server 102 at a later time. The calculated net power requirement is forwarded from the host processor 112 to the management processor 104 via the chipset 110.

The management processor 104 forwards the net power requirement to the control logic 132 of the server stack infrastructure, which applies the net power requirement to the power distribution algorithm 134. The power distribution algorithm 134 updates the allocation of power to the server 102 based on the net power requirement. In the event that the net power requirement update does not occur, the server 102 may continue to receive the maximum power requirement defined by the maximum load value 108.

By allocating power based on the net power requirements (i.e., an actual load value) from the servers 102, 124 rather than the maximum load value 108 described previously, the power supply 140 is potentially able to supply power to an increased number of servers. For example, if the net power requirements of the servers 102, 124 release 1000 W (i.e., the net power requirements of the servers 102, 124 are 1000 watts less than the maximum power requirements of the servers 102, 124), that 1000 W may be used to supply power to additional servers 124. The value of re-allocating power based on the net power requirements increases as the size of servers is reduced (i.e., more servers per server rack), as the power requirements of servers increase and as the hardware inventories of servers vary over time.

To release excess power efficiently from the server 102 (or the additional servers 124), an analysis of possible valid power states and events that may occur in the server 102 is relevant. For at least some embodiments, the possible power states of the server 102 are shown in the Table 2 shown below.

TABLE 2

| POWER STATE | HOST PROCESSOR | MANAGEMENT PROCESSOR | DESCRIPTION |
|---|---|---|---|
| 0 | OFF | OFF | Complete server cold-boot |
| 1 | OFF | ON | Management processor has initialized before host processor is on |
| 2 | ON | OFF | Management processor is reset after the host processor is powered on |

TABLE 2-continued

| POWER STATE | HOST PROCESSOR | MANAGEMENT PROCESSOR | DESCRIPTION |
|---|---|---|---|
| 3 | ON | ON | Host processor is powered on by the management processor |

As shown in the Table 2, the server 102 may have four possible power states associated with the management processor 104 and the host processor 112. The power state "0" refers to when the server 102 is powered up from a cold-boot (i.e., both the host processor 112 and the management processor 104 are powered from an "off" state). The power state "1" refers to when the management processor 104 has been initialized before the host processor 112. The power state "3" refers to when the management processor 104 is reset after the host processor 112 is powered on. The power state "4" refers to when the host processor 112 is powered on by the management processor 104. Thus, in some embodiments, power is dynamically allocated to the server 102 based on the different power states.

In addition to the power states, a number of events that occur in the server 102 also may be relevant to the release of excess power from the server 102. Table 3, shown below, illustrates a number of events associated with the server 102 and how the events are relevant to the release of excess power by the server 102.

TABLE 3

| EVENT | OCCURRENCE | ACTION |
|---|---|---|
| A | Management processor boot process | Do nothing |
| B | Power-on to the server | Request maximum power |
| C | Net power requirement update from the ROM | Release surplus power |
| D | Power-off to the server | Release net (all) power |
| E | Reset the management processor | Do nothing |
| F | Reboot the management processor when the server is on | Do nothing |
| G | Power query from infrastructure (host is on) | Report net power requirement |
| H | Power query from infrastructure (host is off) | Report maximum power requirement |

As shown in Table 3, there are several events that may be relevant to the release of excess power by the server 102. The event "A" refers to a management processor boot process. As a result of the event A, no action relevant to the release of excess power is needed. The event "B" refers to a power-on of the server 102. As a result of the event B, the worst-case theoretical power needs of the server 102 are requested from the power supply 140. As described previously, the worst-case theoretical power needs may be associated with a maximum power value 108 stored by a memory 106 of the server 102.

The event "C" refers to a net power requirement update from the ROM 114. In response to the event C, surplus power (i.e., the difference between the worst-case theoretical power needs and the net power requirement) may be released to the power supply 140. The event "D" refers to a power-off of the server 102. In response to the event D, the net power (or the maximum power) is released to the power supply 140. The event "E" refers to a reset of the management processor 104. In response to the event E, no action relevant to the release of excess power is needed.

The event "F" refers to a reboot of the management processor 104 when the server 102 is on. In response to the event F, no action relevant to the release of the excess power is needed. The event "G" refers to a power query from the server stack infrastructure 130 when the server 102 is powered on. In response to the event G, the net power requirement is reported to the server stack infrastructure 130. The event "H" refers to a power query from the server stack infrastructure 130 when the server 102 is off. In response to the event H, the maximum power requirement is reported to the server stack infrastructure 130.

In addition to the events described in Table 3, other cases or conditions related to the release of surplus power from the servers 102, 124 are possible. For example, when the server 102 is connected to a service bay or to infrastructure power, all software/hardware logic involved in releasing surplus power may be disabled. Also, a net power requirement can never be greater than the maximum power requirement. Otherwise, the maximum power requirement (e.g., the maximum load value 108) is invalid.

Allocating power based on actual hardware inventory rather than worst-case theoretical power needs has several advantages. For example, the above power allocation may improve power redundancy and/or allow more servers to be powered with the same communal power system. Additionally, a more accurate forecast of needed facility power requirements is possible as well as a more accurate forecast of facility cooling requirements. Allocating power based on actual hardware inventory rather than worst-case theoretical power needs also potentially reduces the amount of power supplies needed to power a rack of servers 102, 124, thus decreasing costs.

Figure 2:
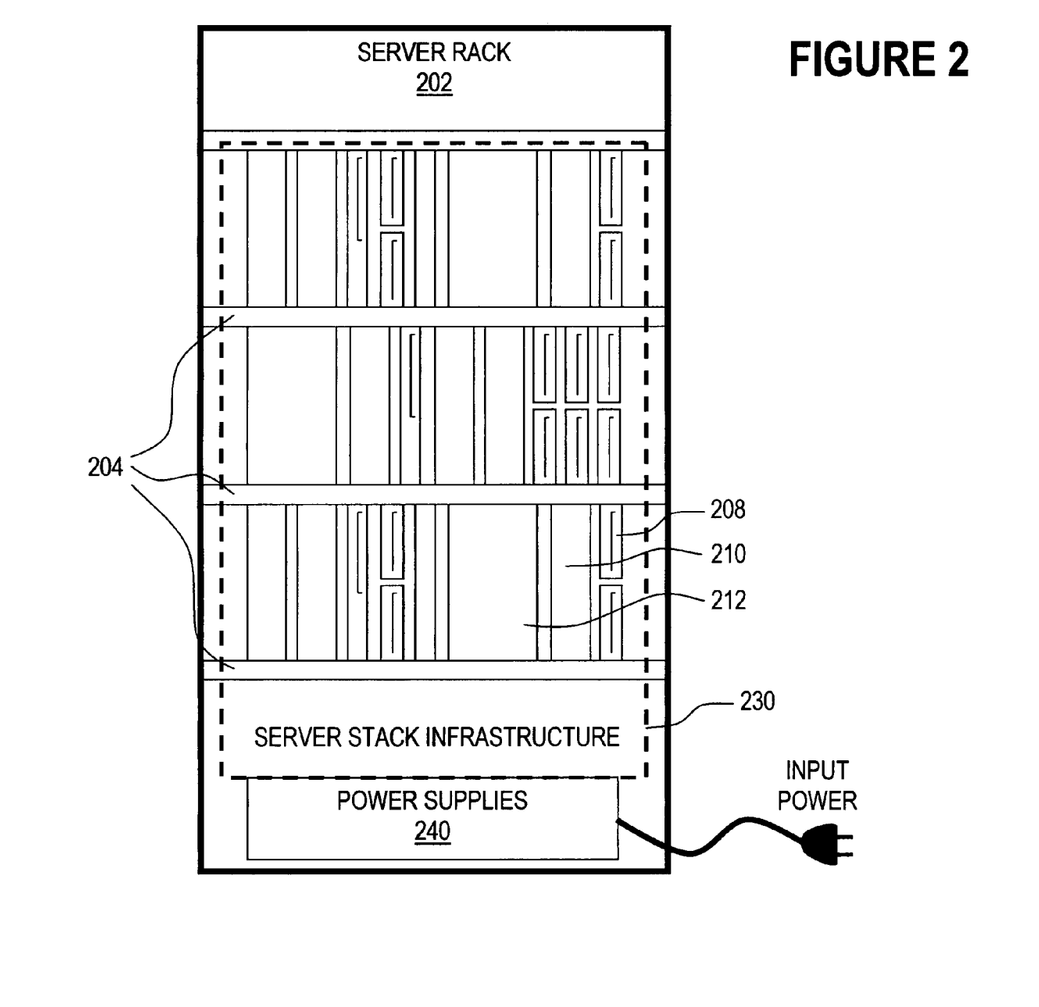
FIG. 2 shows a server rack in accordance with embodiments of the invention.

FIG. 2 illustrates a server rack 202 in accordance with embodiments of the invention. As shown in FIG. 2, the server rack 202 comprises a plurality of shelves 204. Between the shelves 204, a plurality of servers 208, 210, 212 (e.g., blade servers) are stacked. As shown, the servers 208, 210 212 are different sizes and may have varying hardware inventories. To provide power to the servers 208, 210, 212, one or more power supplies 240 are provided within the server rack 202. Allocation of the power from the power supplies 240 to the servers 208, 210, 212 is performed by a server stack infrastructure 230. The power supplies 240 are provided with input power from a facility or other power source.

As time progresses, the servers 208, 210, 212 stored in the server rack 202 may be changed out and/or moved. For example, some servers 208, 210, 212 may stop functioning and are removed from the server rack 202. Servers 208, 210, 212 that stop functioning may be replaced by an equivalent server or may be replaced by a server that has a different hardware inventory. Also, larger servers (e.g., server 212) may be replaced by one or more smaller servers (e.g., servers 208, 210).

By using smaller servers (e.g., server 208), an increased number of servers can be positioned within the server rack 202. However, if the smaller servers 208, 210 consume just as much power as the larger servers 212, the power supplies 240 may not be able to supply sufficient power without being overloaded or, at least, without eliminating some degree of the power redundancy intended for the server rack 202. Accordingly, the servers 208, 210, 212, the server stack infrastructure 230 and the power supplies 240 may implement the power allocation process described for FIG. 1.

In such a power allocation process, worst-case theoretical power needs are provided to one or more of the servers 208, 210, 212. After receiving the maximum theoretical power needs, the one or more servers 208, 210, 212 provide net power requirement values to the server stack infrastructure 230 based on the actual hardware inventories of the servers 208, 210, 212. Providing the net power requirement values to the server stack infrastructure 230 enables the server stack infrastructure to re-allocate surplus power (i.e., the difference between the maximum theoretical power needs and the net power requirement) previously allocated to the one or more servers 208, 210, 212. The power supplies 240 are thus able to provide power to additional servers 208, 210, 212 and/or maintain an increased amount of power redundancy.

In some embodiments, the maximum theoretical power needs may be greater than the net power requirement because a server 208, 210, 212 does not include all the hardware that each server 208, 210, 212 is capable of supporting. For example, a consumer may purchase a server 208, 210, 212 with 100 GB of memory and one processor even though the server is capable of supporting two processors and 200 GB of memory. Therefore, in this simplified example, the maximum theoretical power needs would provide for two processors and 200 GB of memory and the net power requirement (based on the actual hardware inventory) would provide for one processor and 100 GB of memory. If a consumer later increases the hardware inventory of a server 208, 210, 212 (e.g., the consumer adds another processor), the server 208, 210, 212 is configured to detect the additional hardware and update the hardware inventory (e.g., during execution of BIOS code). Therefore, the net power requirements of the servers 208, 210, 212 reflect actual power needs even as the hardware inventories of the servers 208, 210, 212 change.

Figure 3:
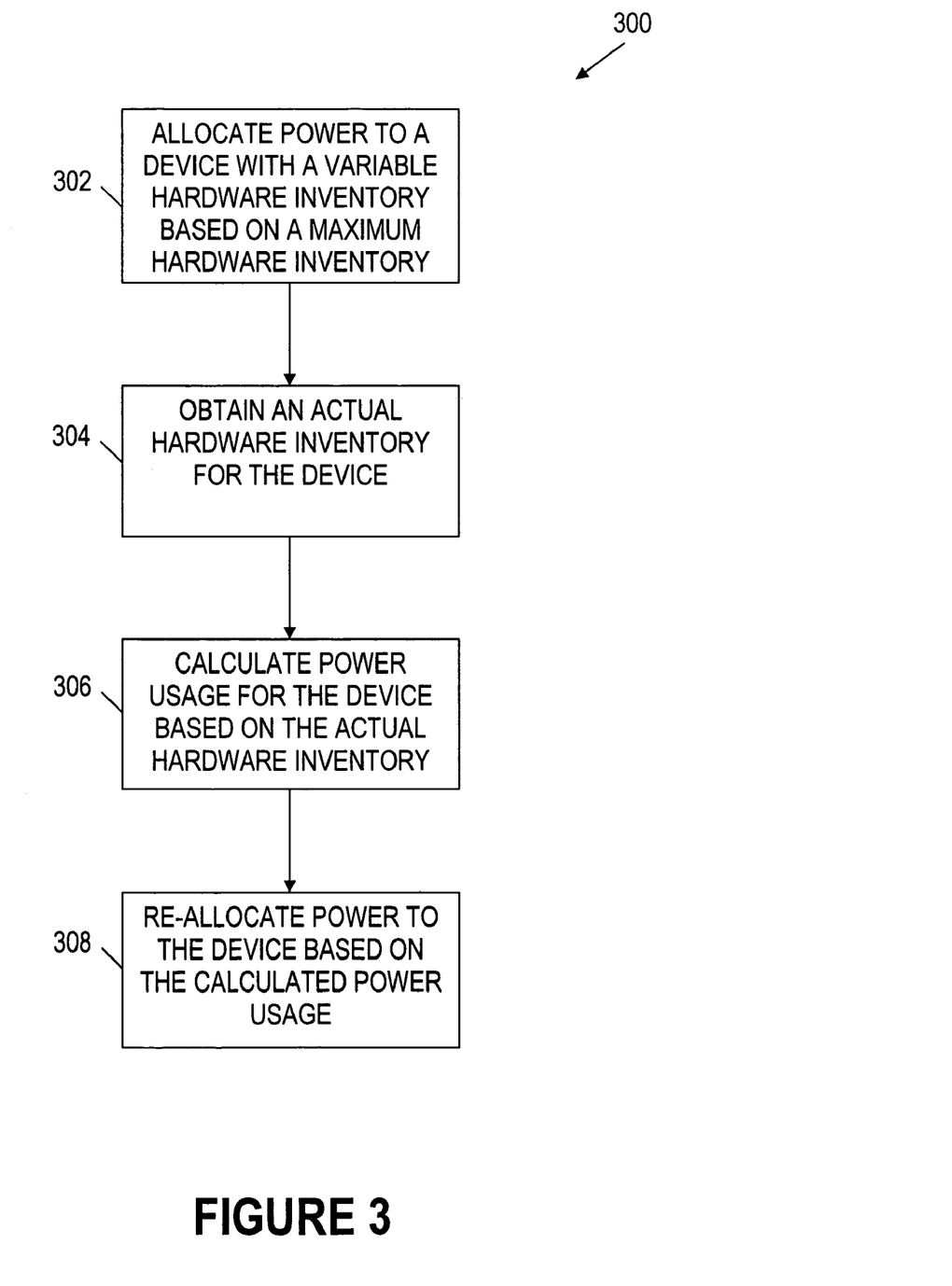
FIG. 3 shows a method in accordance with embodiments of the invention.

FIG. 3 illustrates a method 300 in accordance with embodiments of the invention. As shown in FIG. 3, the method 300 comprises allocating power to a device with a variable (i.e., adjustable up to a maximum/minimum) hardware inventory based on a maximum hardware inventory (block 302). The method 300 further comprises obtaining an actual hardware inventory for the device (block 304). At block 306, a power usage for the device is calculated based on the actual hardware inventory. Power is then re-allocated to the device based on the calculated power usage (block 308).

Figure 4:
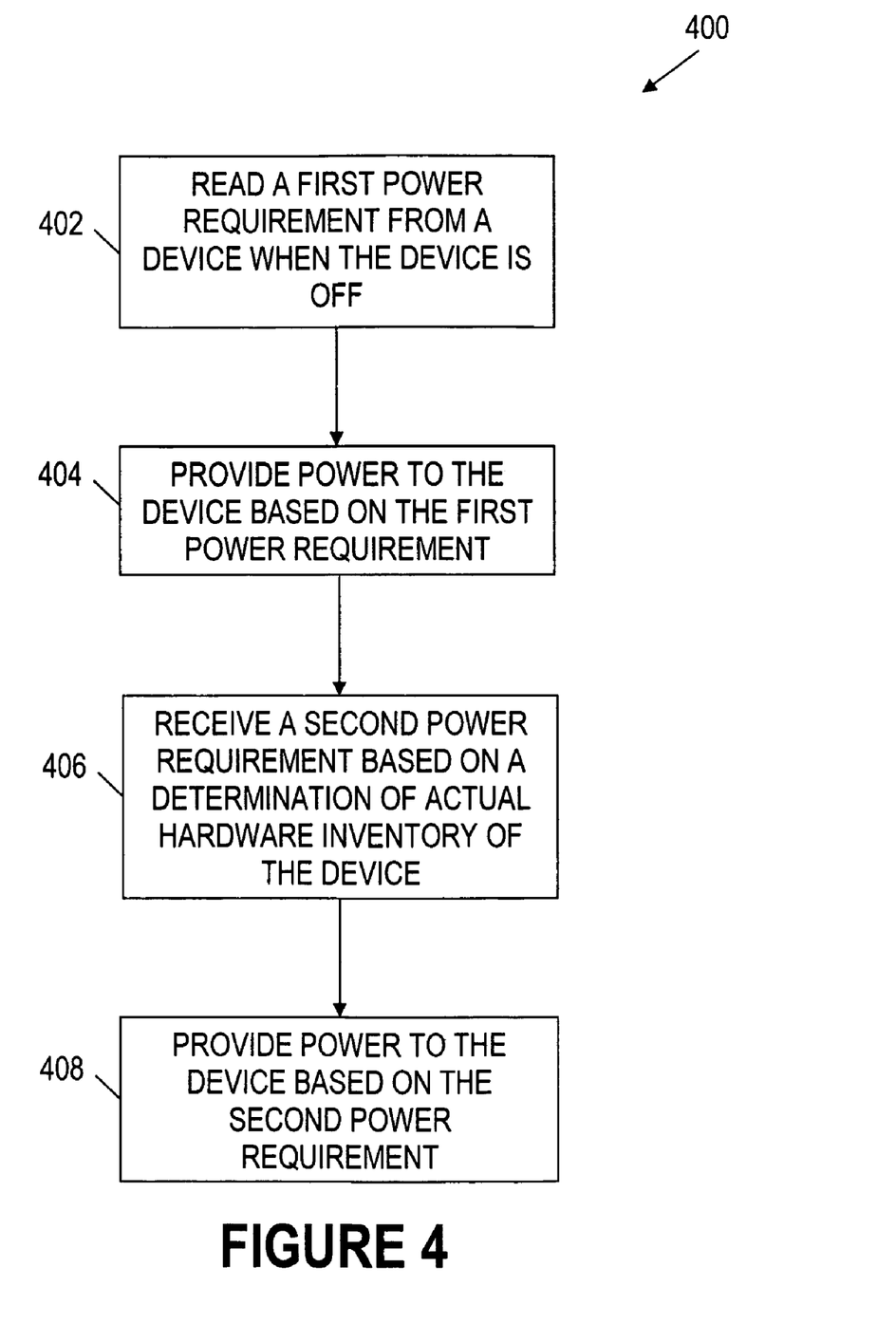
FIG. 4 shows another method in accordance with alternative embodiments of the invention.

FIG. 4 illustrates another method 400 in accordance with alternative embodiments of the invention. As shown in FIG. 4, the method 400 comprises reading a first power requirement from a device when the device is off (block 402). Power is provided to the device based on the first power requirement (block 404). The method 400 further comprises receiving a second power requirement based on a determination of actual hardware inventory of the device (block 406). The determination of the actual hardware inventory may occur when the device is powered on and may involve reading a hardware inventory stored in a BIOS memory or other memory device. Thereafter, power is provided to the device based on the second power requirement (block 408).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   an electronic device having an adjustable hardware inventory; and
   control logic coupled to the electronic device,
   wherein the control logic initially allocates a first amount of power to the electronic device based on predetermined maximum power needs of the electronic device and later allocates a second amount of power to the electronic device based on a determination of a true hardware inventory of the electronic device.

2. The system of claim 1 wherein the predetermined maximum power needs are based on a predetermined maximum hardware inventory supported by the electronic device.

3. The system of claim 2 wherein the predetermined maximum hardware inventory is associated with a maximum load value stored in a memory of the electronic device.

4. The system of claim 3 wherein a management processor of the electronic device reads the maximum load value from the memory and provides the maximum load value to the control logic when the electronic device is off.

5. The system of claim 1 wherein a host processor of the electronic device accesses a memory of the electronic device to determine the true hardware inventory of the electronic device when the electronic device is powered by the first amount of power.

6. The system of claim 5 wherein the memory stores a table that associates each hardware component of the electronic device with a maximum power rating.

7. The system of claim 6 wherein the host processor calculates a net power requirement for the electronic device by summing the maximum power ratings of the hardware components of the electronic device.

8. The system of claim 7 wherein the net power requirement is further based on an estimation of power consumption by one or more hot-pluggable devices.

9. The system of claim 1 wherein the control logic comprises a power distribution algorithm that allocates the first amount of power based on information received from the electronic device when the electronic device is off and that allocates the second amount of power based on information received from the electronic device when the electronic device is on.

10. A computer system, comprising:
    a host processor; and
    a management processor coupled to the host processor, the management processor is configured to transmit a predetermined maximum power requirement of the computer system to power allocation control logic when the host processor is powered off;
    wherein, when the computer system is powered on, the host processor calculates an actual power requirement based on a determination of the computer system's hardware inventory.

11. The computer system of claim 10 wherein the host processor is configured to transmit the actual power requirement to the power allocation control logic via the management processor.

12. The computer system of claim 10 wherein the predetermined maximum power requirement is based on a maximum amount of hardware that the computer system is designed to support.

13. The computer system of claim 10 wherein the management processor reads the theoretical maximum power requirement from a memory coupled to the management processor when the host processor is powered off.

14. The computer system of claim 10 wherein the determination of the computer system's hardware inventory occurs when the host processor queries the hardware components during a power up of the computer system.

15. A method, comprising:
- allocating power to a device with a variable hardware inventory based on a theoretical maximum hardware inventory supported by the device;
- obtaining an actual hardware inventory of the device; and
- allocating power to the device based on the actual hardware inventory.

16. The method of claim 15 further comprising calculating net power usage for the device based on the actual hardware inventory.

17. The method of claim 15 further comprising reading a first power requirement from the device when the device is off, wherein the first power requirement is associated with the theoretical maximum hardware inventory.

18. The method of claim 15 wherein obtaining an actual hardware inventory of the device comprises querying hardware components of the device after the device is being powered based on the theoretical maximum hardware inventory.

19. A system, comprising:
- means for allocating a first amount of power to an electronic device based on a predetermined maximum power requirement of the electronic device; and
- means for allocating a second amount of power to the electronic device based on a determination of the electronic device's true hardware inventory.

20. The system of claim 19 further comprising means for re-allocating the difference between the first amount of power and the second amount of power to another electronic device.

* * * * *

UNITED STATES PATENT AND TRADEMARK OFFICE
CERTIFICATE OF CORRECTION

PATENT NO. : 7,467,306 B2  Page 1 of 1
APPLICATION NO. : 11/074424
DATED : December 16, 2008
INVENTOR(S) : Andrew C. Cartes et al.

It is certified that error appears in the above-identified patent and that said Letters Patent is hereby corrected as shown below:

On the title page, in item (73), in "Assignee", in column 1, line 2, delete "Hosuton" and insert -- Houston --, therefor.

Signed and Sealed this

Fourteenth Day of April, 2009

JOHN DOLL
*Acting Director of the United States Patent and Trademark Office*